No. 690,846. Patented Jan. 7, 1902.
P. S. EKLUND.
NUT LOCK.
(Application filed Apr. 1, 1901.)
(No Model.)

Witnesses
Inventor:
Peter S. Eklund
Edson Bro's,
Attorneys

THE NORRIS PETERS CO., PHOTO-LITHO., WASHINGTON, D. C.

UNITED STATES PATENT OFFICE.

PETER S. EKLUND, OF NEWCASTLE, PENNSYLVANIA.

NUT-LOCK.

SPECIFICATION forming part of Letters Patent No. 690,846, dated January 7, 1902.

Application filed April 1, 1901. Serial No. 53,921. (No model.)

*To all whom it may concern:*

Be it known that I, PETER S. EKLUND, a citizen of the United States, residing at Newcastle, in the county of Lawrence and State of Pennsylvania, have invented certain new and useful Improvements in Nut-Locks; and I do hereby declare the following to be a full, clear, and exact description of the invention, such as will enable others skilled in the art to which it appertains to make and use the same.

My invention relates to certain improvements in nut-locks.

It has for its object, among other things, to provide an effectual lock for the nut as against its accidental or involuntary turning of the bolt under a jarring action. It further provides for the ready tightening of the bolt by the manipulation or movement of the spring primarily designed to aid the locking of the nut upon the bolt.

It is simple, readily constructed, cheaply manufactured, and employs but a single nut to aid the locking action, as differentiated from the use of two nuts as employed for that purpose.

It consists of the novel features of construction, including their combination and arrangement, all substantially as hereinafter more fully disclosed, and specifically pointed out by the claim.

Figure 1:
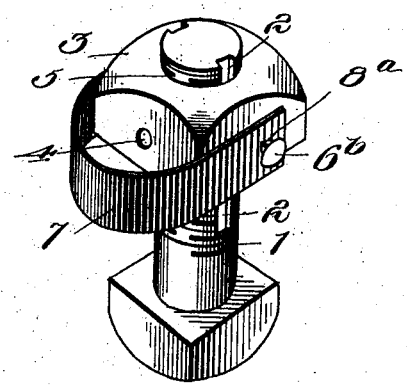
Figure 2:
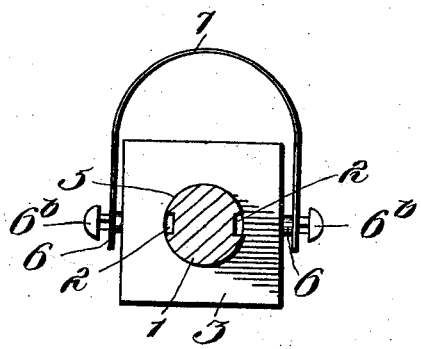
Figure 3:
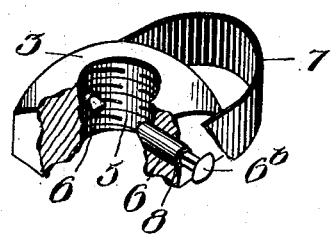

In the accompanying drawings, illustrating the preferred embodiment of my invention, Figure 1 is a perspective view. Fig. 2 is a transverse section through the bolt at a line below the nut. Fig. 3 is a broken detached perspective view of the nut and its adjunctive parts.

Latitude is allowed herein as to details, as they may be changed or varied at will without departing from the spirit of my invention and the same yet remain intact and be protected.

In carrying out my invention I provide the screw-threaded bolt 1 with opposite longitudinal slots or grooves 2, extending substantially the length of the threaded portion thereof and beginning or having their entrances at the extreme unheaded end of said bolt. Said slots or grooves are of a depth fully equal to or deeper than the threads of the screw.

The nut 3, which may be quadrangular, hexagonal, or other angular outline, has opposite or alined passages 4 4, preferably four, opening out through the sides thereof and into the bolt-receiving orifice or hole 5. Into these passages are inserted or disposed pawls or detents 6, the outer portions 6$^a$ of which are angular in cross-section for a purpose presently seen, preferably having their inner ends oppositely beveled, as shown, and adapted to engage the grooves or slots 2 in the bolt 1, the purpose of which will presently appear. The outer ends of the detents or pawls 6 are headed, as at 6$^b$, to prevent the liability of their accidental detachment from the spring, presently described.

Applied to the pawls or detents 6 is a common preferably bowed spring 7, preferably of flat spring metal, the outer angular projecting ends of said detents passing through corresponding holes or apertures 8$^a$ in said spring near its ends and said ends of said spring resting or bearing upon shoulders 8$^b$, formed upon said detents or pawls.

It will be observed that with the stated number of holes or passages in the nut, two of which carry the detents or pawls, it is only required to give the nut a quarter-turn in tightening the bolt, said detents being accordingly adjusted as relates to those of said passages registering with the grooves or slots in the bolt. Also it will be seen that the detents or pawls having oppositely-beveled engaging ends and their outer angular ends having the continuous spring applied thereto by properly moving said spring, bringing its bow in alinement with the bolt, said detents are adapted to be presented to the edges of the slots or grooves in the bolt so as to permit said ends of said detents to snap past said edges as the nut is turned, enabling the nut to be screwed firmly "home" in tightening the bolt. Of course when said spring is moved into a position laterally of the bolt the pawls will be so disposed as to effect the locking thereof with relation to the grooves or slots in the bolt, and thus prevent the nut from being turned without retracting or withdrawing the engaging ends of said pawls from said slots or grooves.

Having thus fully described my invention, what I claim, and desire to secure by Letters Patent, is—

A nut-lock comprising a bolt having a longitudinal slot or groove in its threaded portion and a nut having a detent or pawl, and a spring connected up with said detent to provide for turning the detent to allow it to snap past said groove or slot, and to be reversed to lock it with relation to said groove, substantially as set forth.

In testimony whereof I affix my signature in presence of two witnesses.

PETER S. EKLUND.

Witnesses:
F. A. HOVER,
L. L. McKAY.